United States Patent [19]
Saintain

[11] Patent Number: 5,573,793
[45] Date of Patent: Nov. 12, 1996

[54] FOOD COMPOSITION AND METHOD OF MAKING A COOKIE OR A CHOCOLATE SHELL CONTAINING A FERMENTED FILLING BASED ON A DAIRY PRODUCT

[75] Inventor: Michel Saintain, Fontenay Les Briis, France

[73] Assignee: Compagnie Gervais Danone, France

[21] Appl. No.: 393,225

[22] Filed: Feb. 23, 1995

[30] Foreign Application Priority Data

Feb. 23, 1994 [FR] France .................................... 94 02036

[51] Int. Cl.$^6$ .............................. A23C 9/12; A23C 9/133; A23L 1/09
[52] U.S. Cl. ............................ 426/34; 426/306; 426/572; 426/573; 426/583; 426/613; 426/660
[58] Field of Search .............................. 426/34, 583, 613, 426/660, 306, 572, 573

[56] References Cited

U.S. PATENT DOCUMENTS

| | | | |
|---|---|---|---|
| 1,434,667 | 11/1922 | Thompson. | |
| 4,146,652 | 3/1979 | Kahn et al. | 426/570 |
| 4,150,163 | 4/1979 | Peterson | 426/583 |
| 4,748,026 | 5/1988 | Keefer et al. | 426/583 |

FOREIGN PATENT DOCUMENTS

| | | |
|---|---|---|
| 0 283 101 | 9/1988 | European Pat. Off. . |
| 0 338 121 | 10/1989 | European Pat. Off. . |
| 583 399 | 1/1925 | France . |
| 1 321 489 | of 1963 | France . |
| 2 378 456 | of 1978 | France . |
| 2639796 | 6/1990 | France . |

Primary Examiner—Helen Pratt
Attorney, Agent, or Firm—Dechert Price & Rhoads

[57] ABSTRACT

A food composition of the type containing a cookie or a chocolate shell and a filling based on a dairy product wherein the filling is fermented and contains live lactic acid bacteria, has a water activity (Aw) of between 0.75 and 0.81 and wherein the fat content of the filling is such that it makes it possible to obtain a water-in-oil type emulsion.

37 Claims, No Drawings

FOOD COMPOSITION AND METHOD OF MAKING A COOKIE OR A CHOCOLATE SHELL CONTAINING A FERMENTED FILLING BASED ON A DAIRY PRODUCT

The present invention relates to a food composition based on a dairy product, and in particular yoghurt.

There have been for some time in the sector of food compositions products called food bars based on various pastry products filled with chocolate products and/or various sweet products.

This type of product is perceived by the consumer as being a long-life product in the same way as plain cakes for example.

Even if the image of these products has changed through the presentation of new so-called soft specialties, it has practically never been possible until now to obtain a product having the appearance of a food bar but which can be perceived as a fresh or semifresh product.

The object of the present invention is to propose a food composition having the appearance and some of the properties of traditional food bars, but containing a composition based on dairy products, fermented or otherwise, and more particularly based on yoghurt.

It should first be recalled that yoghurt is a product obtained by fermentation of milk with a number of perfectly classified bacterial strains which, alone, give rise to the designation yoghurt; but, above all, that yoghurt is, among the fermented milk specialties, one of the few in which the lactic acid bacteria are still alive during consumption.

This is precisely one of the problems which needs to be solved during the preparation of a food bar containing yoghurt, namely maintaining the lactic acid bacteria alive without, as a result, favoring the development of contaminants such as molds or yeasts.

In addition, the composition should have a fresh product note, that is to say that from the organoleptic point of view, it is perceived as "fresh" but that it is preferably assimilable, from the regulatory point of view, to fresh products, that is to say products which can be preserved at 4 to 6° C. for a few weeks, preferably for the order of 4 to 6 weeks.

This problem has been solved by virtue of the present invention which relates more particularly to food compositions of the type containing a cookie or a chocolate shell and a filling based on fermented dairy product, wherein the filling, if it is fermented, contains live lactic acid bacteria, has a water activity (Aw) of between 0.75 and 0.86, preferably 0.80 and 0.85, before being brought into contact with the cookie or the chocolate shell, and said food composition being equilibrated at an Aw of between 0.75 and 0.81, and wherein the fat content of the filling is such that it makes it possible to obtain a water-in-oil type emulsion.

Thus, the food composition with cookie is subject to a controlled migration of water from the filling (Aw of the order of 0.85) towards the cookie (Aw of the order of 0.25 to 0.45). The equilibration of the Aw's to a value between 0.75 and 0.81 occurs in less than 7 days, which makes it possible for the product to be already equilibrated when it is offered to the consumer, and this up to 4 weeks to 6 weeks after its date of manufacture, the product being preserved between 4° and 6° C.

This equilibration can be obtained especially by means of a yoghurt filling which contains live bacteria and has an Aw between 0.75 and 0.86 and can be obtained by overrun of an oil-in-water type emulsion reversed, during the preparation of the filling, to a water-in-oil type emulsion, said emulsion containing:

from 25 to 50% by weight of yoghurt, a sufficient quantity of fat, for example from 15 to 35%, to allow the emulsion, said fat being a copra oil or an equivalent fat, and Aw depressants.

Preferably, the fat content of the emulsion represnts from 20% to 40% by weight of the emulsion.

This type of filling also allows the preparation of a chocolate bar in which the migration of water is controlled by the hydrophobic character of the filling and the chocolate shell.

The water activity of a product is a notion which is well-known in the food sector, this measurement, often abbreviated to the form of (Aw), measures the availability of water in a sample. In most cases, this water activity is not proportional to the water content of the product.

By way of example, there may be mentioned:

chocolate: about 1% water: (Aw) =0.50 butter : 16% water: (Aw) =0.99 fruit yoghurt: 82% water: (Aw) =0.99

10% glycerol in water: (Aw) =0.95

The methods permitting the measurement of the Aw of a product are known to persons skilled in the art.

As indicated earlier, the fermented dairy product-based filling will be preferably based on yoghurt, that is to say that it will contain from 25 to 50% by weight of yoghurt. The live bacteria are in this case *S. thermophilus* and *L. bulgaricus*, but it is also possible to provide for the presence of other lactic acid bacteria such as for example *L. acidophilus* or *bifidus*.

Up until now, there have never been manufactured and marketed in a positive cold chain (4–6° C.) food bars containing fresh yoghurt as an ingredient, the latter maintaining numerous and active live lactic acid bacteria up to the end of the product's shelf life.

Given that maintaining the yoghurt bacteria alive requires, it seems, a very high (Aw) (>0.95), protection against microbial contaminations by Aw values >0.95 is very limited and therefore requires the introduction of decontaminating processes and strict hygiene procedures so as to allow the preservation of these products. It would have been possible to make a sterile cookie with an Aw of 0.80 for this type of product, but, on the other hand, the technology required would have made the product excessively expensive.

Now, it has been shown that it was possible to obtain yoghurt-based compositions in which the bacteria remain viable, provided a water activity of between 0.75 and 0.86, in particular 0.80 and 0.85, is maintained. Under these conditions, it is also possible to inhibit the growth of the most common contaminants of cookies and their propagation in the filling, their pH being, in this case, between 4.4 and 5.

Preferably, the composition of the present invention contains a filling containing 25 to 50% by weight of yoghurt, the filling having been formulated to reduce the availability of water by the following processes:

use of Aw depressants preparation of an "oil-in-water" type emulsion reversed to a "water-in-oil" emulsion.

The two processes mentioned above are preferably combined.

Thus, the water in the aqueous phase is stabilized by introducing into the dairy product a certain quantity of fat, especially of plant origin, until a water-in-oil type emulsion is formed by encapsulating the water and its solutes. To do this, it is possible to use in particular of the order of 15to 35%, preferably 25 to 30% by weight of fat of plant origin.

The fats according to the present invention are preferably copra oils or equivalent oils. These fats which are used are crystallized at a temperature of between 15 and 25° C. and liquefied at a temperature greater than 35° C. and have a semisoftening temperature of the order of 25 to 28° C. or a melting range between 24 and 30° C.

The emulsion obtained under these conditions is very stable but becomes liquid in the mouth with a fresh product note.

In order to enhance the freshness and melting characteristics of the filling, a percentage overrun greater than 30%, preferably from 60 to 70%, is used by injecting an inert gas. In some cases, the percentage overrun can be as high as or exceed 200%.

Thus, it is possible, in order to reduce the Aw, to increase the sugar content of the dairy product, for example by adding sugars such as glucose in the form of glucose syrup, maltose, maltodextrins or alternatively polyols such as sorbitol. The use of sugars whose composition does not excessively increase the sweetening power of the medium will be preferred so as to retain a fresh product note in the food bar. Glycerol will also constitute a good Aw depressant.

It will be possible for the quantity of sugars added to be between 10 and 40%, especially from 20 to 40% by weight of fermented dairy product-based filling.

Generally, the total quantity of sugars and fat other than the yoghurt will be between 25 and 75%, especially from 40 to 70% of the composition. It will be possible for the fermented dairy product to comprise, in addition to the yoghurt and the components mentioned earlier, other components which are customary in this domain, even if on the whole, the use of additives which could reduce the "fresh product" note will be avoided.

It is possible, under these conditions, to obtain Aw values for the fermented or unfermented dairy product-based filling of the order of 0.80 to 0.86.

The cookie which can he used may he of any type known in this sector hut should meet three criteria:

remain firm after equilibration of the Aw values, not be sticky when in contact with the hands after equilibration of the Aw values absorb a sufficient quantity of water and combine it, so as to participate in the reduction of the Aw of the filling.

The term cookie is understood to mean both genoese or hard cookie type products or an equivalent pastry which can be used in cookie manufacture.

The combination of these two types of products, cookie and filling, at the Aw values described, makes it possible to both cause and control the migration of water from the dairy product-based filling to the cookie, which confers the desired texture and its organoleptic qualities while not permitting the growth of contaminants originating from the cookie. Using the composition according to the invention, it is not necessary to manufacture a cookie under sterile conditions, and the survival of the yoghurt bacteria is maintained so as to be able to take advantage of the legal designation and of its health effects.

Although the finished product, in particular the fermented dairy product-based filling, has preferably not been subjected to heat treatment, it is possible to dispense with the drastic conditions of sterile manufacture for combining the cookie or the chocolate shell and the dairy filling, which even renders possible mixtures of fermented dairy product-based filling with products such as fruits in syrup, semicandied fruits, candied fruits, dried fruits, chocolates and various products, these components being practically impossible to sterilize by conventional means without their losing a substantial part of their organoleptic qualities. Within the framework of the present invention, the composition in particular by weight of the filling does not incorporate the products mentioned earlier, the filling is termed "white filling".

Of course, the food composition according to the present invention can be provided in many forms, the simplest form is that of the food bar in which the fermented or unfermented dairy product-based filling is placed between two layers of cookie, but it is obviously possible to provide for other embodiments for which the fermented or unfermented dairy product and the cookie layer are arranged differently. The same applies to the chocolate. bar with the filling, especially based on yoghurt, covered with caramel and dried fruit, the whole coated with chocolate.

It should be noted that the present invention also relates to the dairy product-based filling which is fermented and then heat-treated in order to kill the bacteria, the product being, in this case, assimilable according to the invention to this unfermented dairy product.

It should be noted that the present invention also relates to the new fermented dairy product-based filling itself, since this is a product which constitutes to a certain extent a solid yoghurt which has the organoleptic qualities of a fresh product but which, nevertheless, is not subject to the development of contaminating agents and which can, under these conditions, be used possibly alone, in particular on or in an inedible support, a pot or a box, a tube for example, or alternatively with edible supports which are not wettable or are hardly wettable such as azyme breads or chocolate layers for example.

The following examples give formulae presenting the characteristics of the products according to the present invention. The combination of the different products obtained leads to great survival of the lactic acid bacteria in the yoghurt after storing for 28 days at 4° C. Under these conditions, most strains of yeast, mold and pathogenic contaminants do not develop substantially, in particular when the compositions have Aw values of less than 0.86, the products being preserved at 4° C.

| FILLING FORMULA | | |
|---|---|---|
| INGREDIENTS | PERCENTAGES | POSSIBLE PERCENTAGES |
| Yoghurt | 33.2 | 30–35 |
| Glucose | 17 | 15–20 |
| Maltose | 6 | 4–8 |
| Other sugars | 2 | 0–5 |
| Gelatin | 1.5 | 0.3–1.5 |
| Guar gum | 0.3 | 0.1–0.5 |
| (Polyol) Sorbitol | 5 | 4–6 |
| Water | 2 | 0–5 |
| Fat | 28 | 25–30 |
| Emulsifiers | 1 | 1–5 |
| Milk proteins | 4 | 0–6 |
| | 100 | |

| MILK BARS | | |
|---|---|---|
| Example sandwich formula: | cookie | 40% |
| | filling | 60% |
| Example chocolate bar: | chocolate | 45% |
| | filling | 55% |

The manufacture of the filling can be carried out as follows: the sugars as well as the milk proteins and the emulsifier are added gradually to the yoghurt, with slow stirring.

The fat containing the gelling agents in suspension is added to this aqueous mixture, thereby forming the oil-in-water emulsion. The inversion of this emulsion is obtained by vigorous stirring for a few minutes, during which the filling becomes overrun.

VARIATION OF THE WATER ACTIVITY
DURING STORAGE AT 4° C.
AW

|  | Cookie A | Filling | Finished product |
|---|---|---|---|
| D = 0 | 0.25 | 0.85 | — |
| D + 7 | 0.65 | 0.81 | 0.75 |
| D = 14 | 0.68 | 0.80 | 0.73 |
| D + 21 | 0.73 | 0.78 | 0.74 |
| D + 28 | 0.74 | 0.77 | 0.74 |

AW

|  | Cookie B | Filling | Finished product |
|---|---|---|---|
| D = 0 | 0.43 | 0.86 | — |
| D + 7 | 0.75 | 0.78 | 0.75 |
| D = 14 | 0.77 | 0.80 | 0.80 |
| D + 21 | 0.80 | 0.80 | 0.80 |
| D + 28 | 0.81 | 0.80 | 0.81 |

I claim:

1. A food composition of the type containing a cookie or a chocolate shell and a filling based on a fermented dairy product containing live lactic acid bacteria, wherein the filling had a water activity (Aw) of between 0.75 and 0.86 before being brought into contact with the cookie or the shell, wherein said food composition is equilibrated at an Aw of between 0.75 and 0.81 and wherein the filling is in the form of a water-in-oil type emulsion.

2. The composition as claimed in claim 1, wherein the fermented dairy product-based filing has not been subjected to a heat treatment effective to kill the bacteria.

3. The composition as claimed in claim 1, wherein the Aw of the filling before being brought into contact with the cookie or the shell was between 0.8 and 0.85.

4. The composition as claimed in claim 3, wherein the filling contains a quantity of sugars between 10 and 40% by weight.

5. The composition as claimed in claim 4, wherein the sugars are chosen from the group consisting of glucose, maltose and polyols.

6. The composition as claimed in claim 1, wherein the filling is based on yoghurt.

7. The composition as claimed in claim 6, wherein the filling contains 25 to 50% yoghurt.

8. The composition as claimed in claim 7, wherein the filling contains in addition to yoghurt, from 15% to 35% by weight of fat.

9. The composition as claimed in claim 6, wherein the filling contains, in addition to yoghurt, from 15 to 35% by weight of fat.

10. The composition as claimed in claim 6, wherein in the filling, the total quantity of sugars and fat other than the yoghurt is between 25 and 75% by weight.

11. The composition as claimed in claim 4, wherein in addition to the yoghurt, the filling contains fruit or products derived from fruit.

12. The composition as claimed in claim 1, wherein the filling is placed between two layers of cookie.

13. The compositions as claimed in claim 1, wherein the filling has a percentage overrun greater than 30%.

14. The composition as claimed in claim 1, wherein the water-in-oil type emulsion is obtained by reversion of an oil-in-water emulsion.

15. The food composition as claimed in claim 1, wherein the food composition contains a chocolate shell and comprises a chocolate bar.

16. The food composition of claim 15 wherein the filling comprises a caramel layer superimposed on a filling which is yoghurt based.

17. A filling for use in a food composition, wherein the filling is based on a fermented dairy product containing live lactic acid bacteria, wherein the filling has a water activity (Aw) of between 0.75 and 0.86, wherein the Aw can be equilibrated to between 0.75 and 0.81 by contact with a cookie or shell, and wherein the filling is in the form of a water-in-oil type emulsion.

18. The filling as claimed in claim 17, wherein the filling is based on yoghurt.

19. The filling as claimed in claim 18, wherein the filling contains, in addition to the yoghurt, 15 to 35% by weight fat.

20. The filling as claimed in claim 18, wherein the total quantity of sugars and fat other than yoghurt is between 25 and 75% by weight.

21. The filling as claimed in claim 18, wherein the filling contains 25 to 50% yoghurt by weight.

22. The filling as claimed in claimed 21, wherein the filling contains, in addition to the yoghurt, 15 to 35% by weight fat.

23. The filling as claimed in claim 18, wherein in addition to the yoghurt, the filling contains fruit or products derived from fruit.

24. The filling as claimed in claim 17, wherein the filling has a percentage overrun greater than 30%.

25. The filling as claimed in claim 17 wherein the water-in-oil emulsion is obtained by reversion of an oil-in-water emulsion.

26. The filling as claimed in claims 17, wherein the dairy product has not been subject to a heat treatment effective to kill the bacteria.

27. The filling as claimed in claim 17, wherein the filling has an Aw between 0.8 and 0.85.

28. The filling as claimed in claim 27, wherein the filling contains a quantity of sugars between 10 and 40% by weight.

29. The filling as claimed in claim 28 wherein the sugars are chosen from the group consisting of glucose, maltose and polyols.

30. The filling of any one of claims 17, 18 or 21 to 27 making up a chocolate bar, wherein the filling has a chocolate shell and wherein the equilibrated Aw is between 0.75 and 0.81.

31. The chocolate bar as claimed in claim 30 which contains a caramel layer superimposed-on the filling wherein the filling is yoghurt-based.

32. A process for obtaining a yoghurt-based filling containing live lactic acid bacteria, wherein the filling has a water activity (Aw) of between 0.75 and 0.86, wherein the Aw can be equilibrated to between 0.75 and 0.81 by contact with a cookie or shell, and wherein the filling is in the form of a water-in-oil type emulsion, the process comprising creating an overrun by injecting an inert gas into or stirring a water-in-oil type emulsion comprising from 25 to 50% by weight yoghurt and from 15 to 35% of added fat, said fat having either (a) a semisoftening temperature of about 25° C. to about 28° C. or (b) a melting range between 24° C. and 30° C.

33. The method as claimed in claim 32, wherein the method further comprises prior to forming the emulsion, crystallizing the fat at a temperature between 15° C. and 25° C. and liquefying the fat at a temperature greater than 35° C.

34. The method as claimed in claim 32, wherein the fat comprises copra oil or an equivalent fat.

35. The method as claimed in claim 32 wherein the fat content of the emulsion represents from 20 to 40% by weight of the emulsion.

36. A chocolate bar comprising a chocolate shell in which the filling is prepared according to any one of claims 32, 33, 34 or 35.

37. The chocolate bar as claimed in claim 36, wherein a caramel layer is superimposed on the filling.

* * * * *